(12) United States Patent
Pears et al.

(10) Patent No.: US 6,632,858 B1
(45) Date of Patent: Oct. 14, 2003

(54) COLORED POLYURETHANES

(75) Inventors: David Alan Pears, Manchester (GB); John Christopher Padget, Frodsham (GB); Mark Robert James, Manchester (GB); Peter Gregory, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/647,477

(22) PCT Filed: Mar. 25, 1999

(86) PCT No.: PCT/GB99/00785

§ 371 (c)(1),
(2), (4) Date: Sep. 29, 2000

(87) PCT Pub. No.: WO99/50326

PCT Pub. Date: Oct. 7, 1999

(30) Foreign Application Priority Data

Mar. 31, 1998 (GB) ............................................. 9806789

(51) Int. Cl.$^7$ ............................ C09D 11/10; C08L 75/04
(52) U.S. Cl. ......................... 523/160; 524/590; 524/871
(58) Field of Search ................................. 523/160, 161; 524/589, 590, 871, 875, 839, 840; 106/31.27, 31.28, 31.6

(56) References Cited

U.S. PATENT DOCUMENTS

| | | | |
|---|---|---|---|
| 4,585,553 A | * 4/1986 | Hikosaka et al. | ............ 210/107 |
| 5,637,638 A | 6/1997 | Chandler et al. | |
| 5,696,182 A | * 12/1997 | Kashiwazaki et al. | ....... 523/161 |
| 5,700,851 A | * 12/1997 | Banning et al. | ............. 523/161 |
| 5,747,554 A | * 5/1998 | Sacripante et al. | .......... 523/161 |
| 5,786,410 A | * 7/1998 | Foucher et al. | .............. 523/161 |
| 5,919,846 A | * 7/1999 | Batlaw et al. | ................ 524/83 |
| 5,973,062 A | * 10/1999 | Harris et al. | ................ 524/590 |
| 6,034,154 A | * 3/2000 | Kase et al. | ................. 523/161 |
| 6,077,338 A | * 6/2000 | Wallstrom | ................. 106/31.6 |

FOREIGN PATENT DOCUMENTS

| | | | |
|---|---|---|---|
| DE | 196 15 898 | | 10/1997 |
| EP | 732 381 | | 9/1996 |
| GB | 1 513 526 | | 7/1978 |
| GB | 2105735 | * | 3/1983 |
| WO | WO 90/00572 | | 1/1990 |
| WO | WO 96/18697 | | 6/1996 |
| WO | WO 99/42428 | | 8/1999 |

* cited by examiner

Primary Examiner—Callie Shosho
(74) Attorney, Agent, or Firm—Pillsbury Winthrop LLP

(57) ABSTRACT

The invention relates to polyurethanes, inks comprising polyurethanes and their use in ink jet printing where the polyurethane comprises a colored water-dissipatable polyurethane obtainable from the reaction of a polyisocyanate, a compound providing water-dispersing groups and a colorant having at least two functional groups.

9 Claims, No Drawings

COLORED POLYURETHANES

This invention relates to polyurethanes, to inks comprising polyurethanes and to their use in ink jet printing.

Ink jet printing involves printing an image onto a substrate by ejecting ink droplets through a fine nozzle onto the substrate without bringing the fine nozzle into contact with the substrate.

There are many demanding performance requirements for colorants and inks used in ink jet printing. For example they desirably provide sharp, non-feathered images having good water-fastness, light-fastness and optical density. The inks are often required to dry quickly when applied to a substrate to prevent smudging, but they should not form a crust which would block the tip of the fine nozzle. The inks should also be stable to storage over time without decomposing or forming a precipitate which could also block the fine nozzle. Thermal and piezoelectric ink jet printers are widely used, thus there is a need for inks, suitable for use in both types of printers, having high colour strength and giving images having light fastness when printed on a typical substrate, especially plain paper.

EP 0769 509 describes a high molecular weight chain extended polyurethane, formed from a colored isocyanate-terminated polyurethane prepolymer, for use in ink jet printers with piezo heads. However this composition is not ideal for use in ink jet printers with thermal heads because the use of heat can result in nozzle blockage and other operability problems.

According to a first aspect of the present invention there is provided a non-isocyanate terminated, colored, water-dissipatable polyurethane having a weight average molecular weight less than 30,000 obtainable from the reaction of a mixture comprising the components:

i) at least one organic polyisocyanate;
ii) at least one isocyanate-reactive compound providing water-dispersing groups; and
iii) at least one colorant having at least two functional groups selected from isocyanate groups and isocyanate-reactive groups.

The colored water-dissipatable polyurethane preferably has a weight average molecular weight (Mw) less than 30,000 because this Mw leads to an improved performance of inks containing the polyurethane, especially for use in thermal ink jet printers. The Mw of the polyurethane is preferably less than 25,000, more preferably from 1000 to 25,000, more preferably from 1000 to 20,000, most preferably from 1000 to 15000 and especially from 1000 to 10,000. Mw may be measured by gel permeation chromatography.

The gel permeation chromatography method used for determining Mw preferably comprises applying the polyurethane to a chromatography column packed with cross-linked polystyrene/divinyl benzene, eluting the column with tetrahydrofuran at a temperature of 40° C. and assessing the Mw of the polyurethane compared to a number of a polystyrene standards of a known Mw. Suitable chromatography columns packed with cross-linked polystyreneldivinyl benzene are commercially available from Polymer Laboratories.

As an alternative to the gpc method for determining Mw, one may use other methods, for example multi-angle light scattering.

Component i) may be any organic polyisocyanate known in the art, preferably having two isocyanate groups, and include aliphatic, cycloaliphatic, aromatic or araliphatic isocyanate. Examples of suitable organic polyisocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenylmethane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred organic polyisocyanates include cycloaliphatic polyisocyanates, especially isophorone diisocyanate, and aliphatic isocyanates, especially 1,6-hexamethylene diisocyanate or hydrogenated 4,4-diphenyl methyl diisocyanate. A small quantity of triisocyanates may be included as part of component i) but this amount preferably does not exceed 5% by weight relative to the total weight of component i). In a preferred embodiment component i) consists of a mixture of diisocyanate and from 0 to 5% of triisocyanate by weight relative to the diisocyanate.

Component ii) providing water-dispersing groups preferably has at least one, and preferably two, isocyanate-reactive groups. Preferred isocyanate-reactive groups are selected from —OH, —NH$_2$, —NH— and —SH. Isocyanate-reactive compounds having three isocyanate-reactive groups may be present, preferably in low levels not exceeding 5% by weight relative to the total weight of component ii). These isocyanate-reactive groups are capable of reacting with an isocyanate (—NCO) group in component i) or component iii).

The water-dispersing groups are preferably present in the polyurethane as in-chain, pendant or terminal groups. Further water-dispersing groups may be introduced into the polyurethane by means of a capping reagent having one isocyanate or isocyanate-reactive group and a water-dispersing group.

The nature and level of water-dispersing groups in the polyurethane influences whether a solution, dispersion, emulsion or suspension is formed on dissipation of the polyurethane.

The water-dispersing group content of the polyurethane may vary within wide limits but is usually selected to be sufficient to ensure the polyurethane forms stable ink-jet printing inks in water and aqueous media. The polyurethane is preferably soluble in water, although minor amount of the polyurethane may be insoluble in water and exist as dispersed particles when mixed with aqueous media or water. Preferably the proportion of insoluble polyurethane is less than 50%, preferably less than 40% and most preferably less than 30% by weight relative to the total weight of the polyurethane. This allows the preparation of concentrates which may be used to prepare more dilute inks and reduces the chance of the polyurethane precipitating if evaporation of the aqueous media occurs during storage. The size of insoluble polyurethane particulates when dissipated in an ink is preferably less than 100nm, and more preferably less than 60nm.

The water-dispersing groups may be ionic, non-ionic or a mixture of ionic and non-ionic water-dispersing groups. Preferred ionic water-dispersing groups include cationic quaternary ammonium groups and anionic phosphonic acid groups, sulphonic acid groups and carboxylic acid groups. More preferred ionic water-dispersing groups are sulphonic acid groups and carboxylic acid groups.

The ionic water-dispersing groups may be incorporated into the polyurethane in the form of a low molecular weight monomers, polyol or polyamine bearing the appropriate ionic water-dispersing groups where polyol excludes polyesters bearing sulphonic acid groups. Preferred isocyanate-reactive compounds providing water-dispersing groups are diols having one or more carboxylic acid groups or sulphonic acid groups, where examples include bis(2-hydroxyethyl)-5-sodiosulphoisophthalate and dihydroxy alkanoic acids, especially 2,2-dimethylol propionic acid and/or mixtures thereof.

The carboxylic and sulphonic acid groups may be subsequently fully or partially neutralised with a base containing a cationic charge to give a salt. If the carboxylic or sulphonic acid groups are used in combination with a non-ionic water-dispersing group, neutralisation may not be required. The conversion of any free acid groups into the corresponding salt may be effected during the preparation of the-polyurethane and/or during the preparation of an ink from the polyurethane.

Preferably the base used to neutralise any acid water-dispersing groups is ammonia, an amine or an inorganic base, more preferably ammonia is used. Suitable amines are tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the ink which is prepared from the polyurethane. For example, suitable counter ions include $Li^+$, $Na^+$, $K^+$, $NH_4^+$, $Cs^+$ and substituted ammonium salts, including tributylammonium, imidazolium, tetramethyl ammonium, tetraethyl ammonium, tetrabutyl ammonium, tetrabutyl phosphonium and trimethyl sulphonium salts. $NH_4^+$ is especially preferred.

Prefered non-ionic water-dispersing groups are in-chain, terminal and pendant polyoxyalkylene groups, more preferably polyoxypropylene and polyoxyethylene groups. Examples include groups of the formula: $RO(CH_2CH_2O)_nH$, $RO(CH_2CH_2O)_n(CH_2CH(CH_3)O)_yCH_2CH(CH_3)NH_2$, or $H_2NCH(CH_3)CH_2(CH(CH_3)CH_2)_y(CH_2CH_2O)_n(CH_2CH(CH_3)O)_yCH_2CH(CH_3)NR^1R^1$, wherein n=1 to 100, R is H or $CH_3$, each $R^1$ independently is H or a substituted or unsubstituted $C_{1-10}$ alkyl group (especially —$CH_2CH_2$—OH) and y=2 to 15.

The function of component iii) is to colour the polyurethane. Component iii) preferably comprises a chromophoric group and at least two functional groups selected from isocyanate and isocyanate-reactive groups. Preferably the colorant has two of said functional groups. Colorants having three of said functional groups may be present in low levels, preferably not exceeding 5% by weight relative to the weight of colorant having two of said functional groups.

The functional groups may be attached directly to the chromophoric group or may be attached through a linker group. An example of a suitable linker group is an alkylenediamine group attached to a chromophoric group via a triazine ring.

The chromophoric group preferably comprises an azo, anthraquinone, pyrroline, phthalocyanine, polymethine, aryl-carbonium, triphenodioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, pyrroline, benzodifuranone or indolene group or a combination of two or more such groups. More preferred chromophoric groups are azo groups, especially monoazo, disazo, trisazo and phthalocyanine groups. Especially preferred monoazo groups comprise two aryl groups linked by an azo group where optionally one or both aryl groups and heteroaryl groups.

Preferably the colorant is a dye comprising a chromophoric group and at least two functional groups selected from isocyanate and isocyanate-reactive groups, especially a dye which is soluble in organic solvent.

Component iii) preferably comprises from 1 to 10, more preferably 1 to 5, especially 1, 2 or 3 of said dyes. The amount of component iii) used in the reaction mixture depends on the intensity of colour required in the polyurethane. The amount is preferably from 1 to 35%, more preferably from 10 to 30%, especially from 15 to 25% by weight relative to the total weight of components i), ii) and iii).

Optionally the mixture comprising components i), ii) and iii) further comprises a colourless isocyanate-reactive compound which is free from water-dispersing groups. Preferably such compounds are organic polyols or polyamines having a molecular weight up to 3000, more preferably up to 2000, especially from 400 to 2000. Preferred organic polyols include diols which are free from water-dispersing groups and mixtures thereof. Such diols may be members of any of the chemical classes of polymeric diols used or proposed to be used in polyurethane formulations. In particular, the diols may be polyesters, polyesteramides, polyethers (other than ones providing polyethyleneoxide and/or polypropyleneoxide groups), polythioethers, polycarbonates, polyacetals, polyolefins or polysiloxanes.

Further examples of optional diols which are free from water-dispersing groups include organic diols and polyols having molecular weights below 400. Examples of such lower molecular weight diols and polyols include ethylene glycol, diethylene glycol, tetraethylene glycol, bis (hydroxyethyl) terephthalate, cyclohexane dimethanol, furan dimethanol, polyethylene glycol and polypropylene glycol.

Terminating compounds may be used to cap off any excess isocyanate end groups in the colored water-dissipatable polyurethane resulting from the reaction of components i) ii) and iii), by the addition of compounds having an isocyanate-reactive group. Compounds having one isocyanate-reactive group include for example monoalcohols, monohydrazides, monoamines and monothiols. Compounds having two isocyanate-reactive may be used if one of the isocyanate-reactive groups is far more reactive than the other, thereby reacting essentially as a monofunctional terminating compound. For example in ethanolamine the amine group is far more reactive than the hydroxyl group. Optionally the terminating compound may be coloured. Examples of coloured terminating compounds include colorants as hereinbefore described, characterised in that they have only one isocyanate or isocyanate-reactive group.

The terminating compounds may also bear water-dispersing groups. If there are any excess isocyanate-reactive end groups in the coloured water-dissipatable polyurethane resulting from the reaction of components i) ii) and iii), these may optionally be capped off by the addition of compounds having one isocyanate group, for example alkyl monoisocyanates.

The polyurethane may contain further linkages in addition to urethane linkages, for example urea, amide, thiourea or thiourethane linkages. Preferably the coloured water-dissipatable polyurethane of the present invention (and resultant inks) is yellow, magenta, cyan or black.

The polyurethane may be prepared in a conventional manner by reacting the components having isocyanate groups with the components having isocyanate-reactive groups. Temperatures of from 30° C. to 130° C. are preferred and the reaction is continued until the reaction between the isocyanate groups and the isocyanate-reactive groups is substantially complete.

The relative amounts of components i), ii) and iii) are preferably selected such that the mole ratio of isocyanate groups to isocyanate-reactive groups is about 1.1 to 2:1, preferably from 1.2:1 to 2:1 and more preferably from 1.3:1 to 2:1. A two stage process may be utilised where a prepolymer is prepared either in solvent or as a melt, wherein the mole ratio of isocyanate groups to isocyanate-reactive groups from 1.3:1 to 2:1, preferably from 1.9:1 to 2:1, followed by reacting any excess isocyanate end groups with a terminating compound either in solvent or as a melt.

Alternatively a prepolymer may be prepared wherein the ratio of isocyanate groups to isocyanate-reactive groups from 1:1.1 to 1:2, preferably from 1:1.2 to 1:1.9. The excess isocyanate-reactive end groups may optionally be terminated with a terminating compound.

Preferably the polyurethane is not a chain-extended polyurethane. Preferably dissipation of the polyurethane in water results in essentially no chain-extension. In other words, preferably the reaction does not comprise a step in which two or more polyurethane molecules are deliberately linked together in water by a chain-extender, wherein the chain-extender comprises a compound having two or three isocyanate-reactive groups.

If desired a catalyst may be used to assist formation of the polyurethane. Suitable catalysts include butyl tin dilaurate, stannous octoate and tertiary amines as known in the art.

An organic solvent may optionally be included in the reaction mixture to lower its viscosity. Preferably a water-miscible solvent is used, for example N-methylpyrrolidone, dimethyl sulphoxide, dimethylformamide, a dialkyl ether of a glycol acetate methyl ethyl ketone or a mixture thereof.

Preferably the polyurethane according to the first aspect of the present invention has been obtained by the stated process.

Preferably the polyurethane (and any resultant inks) is yellow, magenta, cyan or black.

The polyurethane of the present invention may be purified if desired in the usual way for colorants used in ink jet printing inks. For example a mixture of the polyurethane and water may be purified by ion-exchange, filtration, reverse osmosis, dialysis, ultra-filtration or a combination thereof. In this way one may remove co-solvents used for the polymerisation, low molecular weight salts, impurities and free monomers.

In a second aspect of the present invention there is provided an ink comprising a coloured water-dissipatable polyurethane according to the first aspect of the present invention and a liquid medium. A preferred ink comprises:

(a) from 0.25 to 30 parts of a polyurethane according to the first aspect of the present invention; and (b) up to 99.75 parts of a liquid medium;

wherein all parts are by weight and the number of parts of (a)+(b)=100.

The number of parts of component (a) is preferably from 0.5 to 28, more preferably from 2 to 25, and especially from 5 to 20 parts.

The inks according to the second aspect of the invention may be prepared by mixing the polyurethane with the liquid medium. Suitable techniques are well known in the art, for example agitation, ultrasonication or stirring of the mixture. The mixture of the polyurethane and liquid medium may be in the form of a dispersion, emulsification, suspension, solution or mixture thereof.

Preferably the polyurethane is mixed with a first liquid medium, followed by mixing the resultant mixture with a second liquid medium.

The liquid medium is preferably water, a mixture of water and an organic solvent and an organic solvent free from water. For example the polyurethane may be added to water followed by the addition of one or more organic solvents. Preferably the first liquid medium is an organic solvent and the second liquid medium is water and a mixture of water and one or more organic solvents.

When the liquid medium comprises a mixture of water and an organic solvent, the weight ratio of water to organic solvent is preferably from 99:1 to 1:99, more preferably from 99:1 to 50:50 and especially from 95:5 to 60:40.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic-amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the polyurethane in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

A preferred liquid medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

The ink may also contain a surfactant. This helps to dissipate the polyurethane in addition to the dissipation caused by dispersing groups provided by component ii) of the polyurethane. Optionally the ink may also contain other ingredients used in ink jet printing inks, for example conductivity agents, defoamers, anti-oxidants, corrosion inhibitors, bacteriocides and viscosity modifiers.

The ink preferably has a pH of from 3 to 11, more preferably of from 4 to 10. Such a pH may be obtained by the addition of a base, acid or a pH buffer. Where a base is used this is preferably the same base as was used to neutralise the anionic dispersing group during the preparation of the coloured water-dissipatable polyurethane.

The viscosity of the ink is preferably less than 20 cp, more preferably less than 10 cp, at 20° C.

Preferably the ink has been filtered through a filter having a mean pore size below 10 $\mu$M, preferably below 5 $\mu$M, more preferably below 2 $\mu$M especially of 0.45 $\mu$M. In this way particulate matter is removed which could otherwise block the fine nozzle in an ink jet printer.

The inks of the second aspect of the present invention have the advantage that they are suitable not only for the use of piezoelectric ink jet printers but also for the use of thermal and continuous ink jet printers.

Inks of the second aspect of the present invention form discrete droplets on the substrate with little tendency for diffusing. Consequently sharp images with excellent print quality and little if any bleed between colours printed side by side can be obtained. Furthermore the inks show good storage stability, wet and light fastness and fastness to both acidic and alkaline highlighter pens.

A further aspect of the invention provides a process for printing an image on a substrate comprising applying thereto an ink containing a coloured water-dissipatable polyurethane of the present invention by means of an ink jet printer.

The ink used in this process is preferably as defined in the second aspect of the present invention.

The ink jet printer preferably applies the ink to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the ink in a reservoir by means of a resistor adjacent to the nozzle, thereby causing the ink to be ejected in the form of small droplets directed towards the substrate during relative movement between the substrate and the nozzle. In piezoelectric ink jet printers the oscillation of a small crystal causes ejection of the ink from the nozzle.

The substrate is preferably paper, plastic, a textile, metal or glass, more preferably paper, an overhead projector slide or a textile material, especially paper.

Preferred papers are plain, coated or treated papers which may have an acid, alkaline or neutral character. Most preferably the substrate is a plain or coated paper.

According to a further feature of the invention there is provided an ink jet printer cartridge containing an ink as hereinbefore defined.

The invention will now be described by example only. All parts and percentages are by weight unless specified otherwise. In the examples, compounds referred to by reference to CI numbers are the dyestuffs identified by these numbers in the Colour Index International, $3^{rd}$ Edition, $3^{rd}$ Revision.

Dyes of Formula 1–13: Disperse Dyes Used in the Preparation of Coloured Water-dissipatable Polyurethanes.

Dye 1, CI Disperse Brown 4

A sample of CI Disperse Brown 4 was purified by extraction into ethyl acetate, washed with water and isolated by evaporating the ethyl acetate.

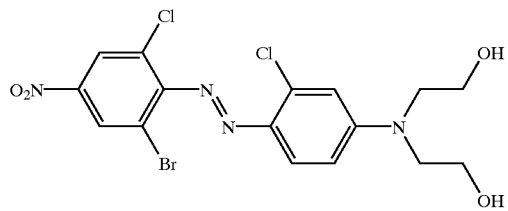

Formula 1

CI Disperse Brown 4

Dye 2—Yellow Disperse Dye of Formula 2:

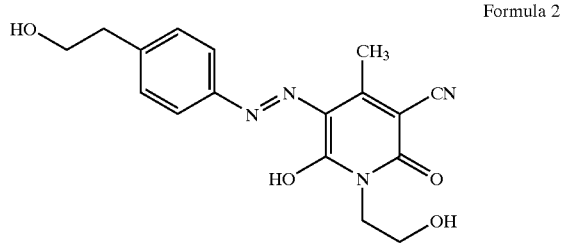

Formula 2

Step 1) Ethyl cyanoacetate (56.5 parts) was added dropwise over 0.25 hours to a stirred solution of ethanolamine (76.25 parts) in water (18 parts) while maintaining the temperature at less than 30° C. Ethyl acetoacetate (65 parts) was then added while maintaining the temperature at less than 30° C. The mixture was stirred at 90° C. for 20 hours, cooled and poured into water (500 parts), the product isolated by filtration, washed with water and dried to give 3-cyano-6-hydroxy4-methyl-1-(2-hydroxyethyl)pyrid-2-one (45 parts).

Step 2) 2-(4aminophenyl)ethanol (13.7 parts) was dissolved in a mixture of water (200 parts) and concentrated hydrochloric acid (30 parts) at 0–5° C. To this mixture was added 2 N sodium nitrite solution (60 parts) over 0.25 hours to form a diazo mixture which was stirred at 0–5° C. for 1 hour, then 10% sulfamic acid was added to destroy the excess nitrous acid.

Step 3) A solution of the product of step 1) (21.3 parts) in a mixture of water (150 parts) and methanol (150 parts) was added to the product of step 2) over 0.25 hours while maintaining the temperature at 0–5° C. Solid sodium acetate was added to raise the pH to approximately pH 4 and the mixture was stirred over night at room temperature, before dye of Formula 2 (34.4 parts) was isolated by filtration, washed with water and dried at 50° C.

Dye 3—Yellow Disperse Dye of Formula 3

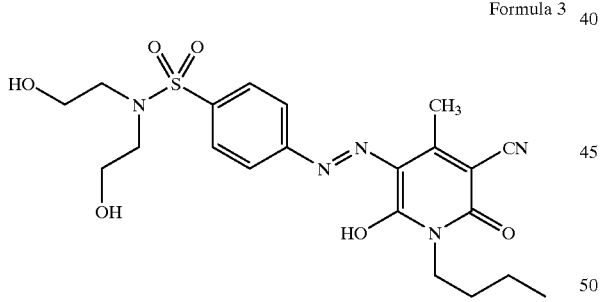

Formula 3

Step 1) Diethanolamine (105 parts) was added dropwise over 10 minutes to a stirred mixture of N-acetyl sulphanilyl chloride (93.5 parts), water (400 parts) and acetone (200 parts) while maintaining the temperature at approximately 5° C. The mixture was allowed to warm to room temperature and stirred over night. The resultant 4-acetylamino-N,N-bis-(2-hydroxyethyl)benzenesulphonamide (103 parts) was isolated by filtration, washed with water and dried.

Step 2) A mixture of the product of step 1) (60 parts) and 2N sulphuric acid (200 parts) was heated under reflux for 4 hours. The mixture was cooled to room temperature and the pH raised to 7 by the addition of sodium hydroxide solution. The product was isolated by filtration, washed with water and dried in a vacuum over calcium chloride at 40° C. to give 4-amino-N,N-bis-(2-hydroxyethyl) benzenesulphonamide (44 parts).

Step 3) The product of step 2) (13 parts) was dissolved in a mixture of water (150 parts) and concentrated hydrochloric acid (15 parts) at 0–5° C. To this mixture was added 2 N sodium nitrite solution (25 parts) over 0.25 hours to give a diazo mixture which was stirred at 0–5° C. for 2 hours, before 10% sulfamic acid was added to destroy the excess nitrous acid.

Step 4) A solution of 1-butyl-3-cyano4-methyl6-hydroxypyrid-2-one (11.3 parts) in a mixture of water (100 parts) and acetone (100 parts) was added to the product of step 3) over 0.5 hours while maintaining the temperature at 0–5° C. After a further hour, solid sodium acetate was added to raise the pH to approximately pH 4 and the mixture was stirred over night at room temperature. The dye of Formula 3 (19.5 parts) was isolated by filtration, washed with water and dried at 50° C.

Dye 4—Cl Disperse Red

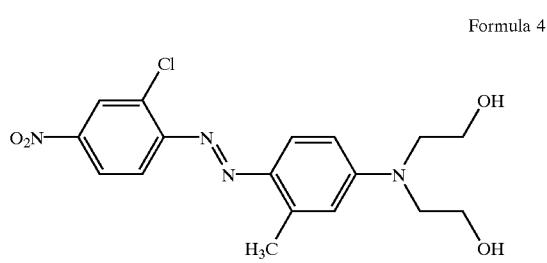

Formula 4

Cl Disperse Red 5

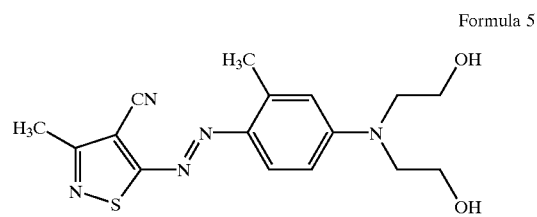

Formula 5

Step 1) 5-Amino4-cyano-3-methylisothiazole (prepared as described in DE 3001945 incorporated herein by reference, 14 parts) was added portionwise over 0.5 hours to a stirred product of step 1) of nitrosylsulphuric acid (25 parts of a 40% solution in sulphuric acid), acetic acid (126 parts) and propionic acid (24 parts) while maintaining the temperature at 0–5° C. for 1 hour.

Step 2) A solution of N,N-dihydoxyethyl-m-toluidine (19.9 parts) in a mixture of water (50 parts), methanol (150 parts) and sulfamic acid (1 part) was added to the stirred product of step 1) over 0.25 hours while maintaining the temperature at 0–5° C. After 1 hour, solid sodium acetate was added to raise the pH to approximately pH 4 and the mixture was stirred over night at room temperature. The resultant dye was isolated by filtration, washed with water and dried at 50° C. The dye was dissolved in acetone, filtered and the acetone evaporated to give a dye of Formula 5 (25.2 parts).

Dyes 6, 7, 8 and 9—Blue Disperse Dyes of Formulae 6, 7, 8 and 9 Dye 6

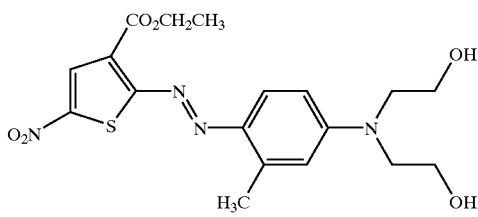

Formula 6

Step 1) 2-Amino-3-ethoxy carbonyl-5-nitrothiophene (prepared as described in DE2304201 incorporated herein by reference, 21.6 parts) was added portionwise over 0.5 hours to a stirred mixture of nitrosylsulphuric acid (25 parts of a 40% solution in sulphuric acid), acetic acid (126 parts) and propionic acid (24 parts) while maintaining the temperature at 0–5° C. for 1 hour. Step 2) A solution of N,N-dihydoxyethyl-m-toluidine (19.9 parts) in a mixture of water (50 parts), methanol (150 parts) and sulfamic acid (1 part) was added to the product of step 1) over 0.25 hours while maintaining the temperature at 0–5° C. After 1 hour, solid sodium acetate was added to raise the pH to approximately pH 4 and the mixture was stirred over night at room temperature. The resultant dye was isolated by filtration, washed with water and dried at 50° C. The dye was dissolved in acetone and THF, filtered, diluted with water and the acetone and THF evaporated to a small volume. The dye of Formula 6 (23.6 parts) was isolated by filtration, washed with water and dried.

Dye 7

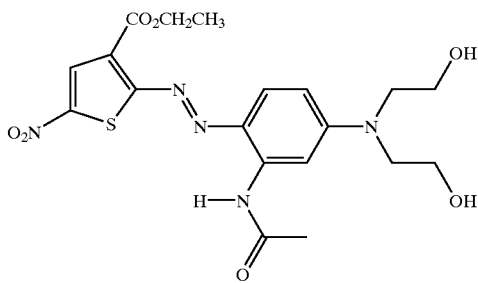

Formula 7

Step 1) 2-Amino-3-ethoxycarbonyl-5-nitrothiophene (21.6 parts) was added portion wise over 0.5 hours to a stirred mixture of nitrosylsulphuric acid (25 parts of a 40% solution in sulphuric acid), acetic acid (126 parts) and propionic acid (24 parts) while maintaining the temperature at 0–5° C. for 1 hour.

Step 2) A solution of N,N-di-β-hydoxyethyl-m-amino acetanilide (26.2 parts) in a mixture of water (50 parts), methanol (150 parts) and sulfamic acid (1 part) was added to the stirred mixture (step 1)) over 0.25 hours while maintaining the temperature at 0–5° C. After 1 hour, solid sodium acetate was added to raise the pH to approximately pH 4 and the mixture was stirred over night at room temperature. The resultant dye was isolated by filtration, washed with water, methanol, water and dried at 50° C. to yield dye of Formula 7 (33.7 parts).

Dye 8

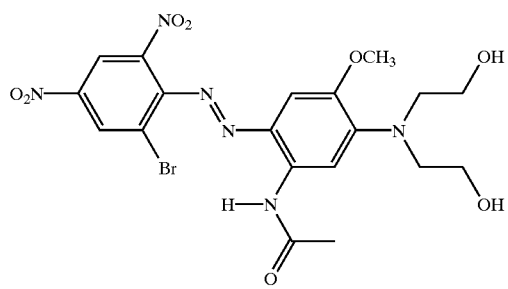

Formula 8

Step 1) 2-Bromo4,6-dinitroaniline (26.2 parts) was added portionwise over 0.25 hours to a stirred mixture of nitrosylsulphuric acid (25 parts of a 40% solution in sulphuric acid), acetic acid (126 parts) and propionic acid (24 parts) while maintaining the temperature at 0–5° C.

Step 2) A solution of 3-(N,N-di-p-hydoxyethyl) amino4methoxy acetanilide (26.8 parts) in a mixture of water (50 parts), methanol (150 parts) and sulfamic acid (1 part) was added to the stirred product from step 1) over 0.5 hours while maintaining the temperature at 0–5° C. After 1 hour, solid sodium acetate was added to raise the pH to approximately pH 4 and the mixture was stirred overnight at room temperature. The resultant dye was isolated by filtration, washed with water and dried at 50° C. to yield the dye of Formula 8 (39 parts).

Dye 9

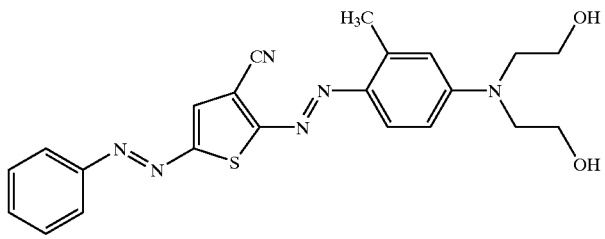

Formula 9

Step 1) Aniline (9.3 parts) was dissolved in 2N hydrochloric acid (150 parts) at 0–5° C. To this stirred mixture was added 2N sodium nitrite solution (55 parts) over 0.25 hours, then stirred at 0–5° C. for 2 hours, before adding 10% sulfamic acid to destroy any excess nitrous acid.

Step 2) The product from step 1) was added to a stirred mixture of 2-amino-3-cyanothiophene (9.2 parts), water (100 parts) and methanol (150 parts) over 0.25 hours while maintaining the temperature at 0–5° C. After 2 hours, the mixture was allowed to 2 0 warm up to room temperature and stirred over night at room temperature. The resultant mono-azo dye was isolated by filtration and washed with water until neutral and dried at 70° C (15.2 parts).

Step 3) Nitrosylsulphuric acid (12.5 parts of a 40% solution in sulphuric acid) was added dropwise to the product from step 2) (5.7 parts), acetic acid (100 parts) and concentrated sulphuric acid (40 parts) while maintaining the temperature at 0° C., and then was stirred at 0–5° C. for 1 hour.

Step 4 The product from step 3) was added dropwise to a stirred mixture of N,N-dihydoxyethyl-m-toluidine (5.28 parts), methanol (100 parts) and sulfamic acid (1 part) over 0.25 hours while maintaining the temperature at 0–5° C. After 0.5 hours, water (100 parts) and solid sodium acetate was added to raise the pH to approximately pH 4 and the mixture was stirred for 1 hour. The resultant dye was isolated by filtration, washed with 1:1 methanol-water and 7:3 methanol-water, dried at 50° C. and purified by silica gel chromatography to yield the dye of Formula 9 (2.0 parts).

Dye 10—Yellow/Brown Disperse Dye of Formula 10

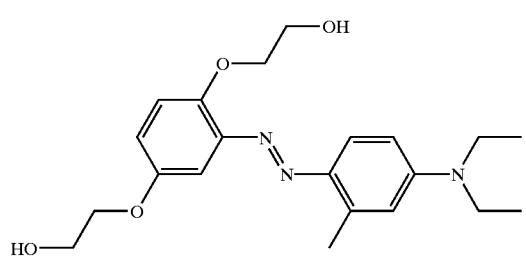

Formula 10

Step 1) Preparation of 1,4-di-(2-acetoxyethoxy)hydroquinone.

Hydroquinone bis-(2-hydroxyethyl)ether (179 parts), acetic acid (1000 parts) and acetic anhydride (300 parts) were stirred and heated to reflux overnight. After cooling to room temperature and pouring into water (2000 parts) the product was isolated by filtration, washed with water, dried and recrystallised from ethanol to give 212 parts of product.

Step 2)

The product of step 1) (211.5 parts) was dissolved in acetic acid (1800 parts). A mixture of nitric acid (51.9 parts) and acetic acid (200 parts) was then added over 20 mins keeping the temperature below 20° C. After stirring at room temperature overnight the solution was poured into water (9000 parts) and the product isolated by filtration, washed with water and recrystallised from ethanol to give 209 parts of product.

Step 3)

The product of step 2) (115 parts) was dissolved in ethanol at 50° C. and reduced with hydrogen in the presence of palladium catalyst (2 parts, 5%Pd/C). When uptake of hydrogen ceased the solution was screened to remove the catalyst and the filtrates allowed to cool to room temperature. The crystalline solid was isolated by filtration and dried under vacuum to give 90 parts of product.

Step 4) 2,5-diacetoxyethoxyaniline (17.8 parts) (step 3)) was dissolved in acetone (300 parts), water (300 parts) and concentrated hydrochloric acid (18 parts) at 0–5° C. To this stirred mixture was added 2N sodium nitrite solution (30 parts) over 0.25 hours, stirred at 0–5° C. for 2 hour, then 10% sulfamic acid was added to destroy any excess nitrous acid.

Step 5) The product of step 4) was added dropwise to a stirred mixture of N,N-diethyl-m-toluidine (9.87 parts), acetone (300 parts), and water (150 part) over 0.25 hours while maintaining the temperature at 0–5° C. After 1 hour, solid sodium acetate was added to raise the pH to approximately pH 4 and the mixture was stirred for 1 hour. The resultant dye was isolated by separating of the aqueous phase, dissolving the dye in methylene chloride, drying the methylene chloride phase with magnesium sulphate and evaporating the solvent to leave the dye (20.1 parts) which crystallised on standing.

Step 6) The product from step 5) (20.1 parts), acetone (300 parts) and 1N sodium hydroxide (30 parts) was heated under reflux for 0.5 hours and after cooling was evaporated to a small volume and methylene chloride was added. The aqueous phase was run off and the methylene chloride phase washed three times with water, dried with magnesium sulphate, treated with silica gel, filtered and evaporated to dryness. The crude product was purified by silica gel chromatography to give the dye of Formula 10 (18.2 parts).

Dye 11—Black Disperse Dye of Formula 11

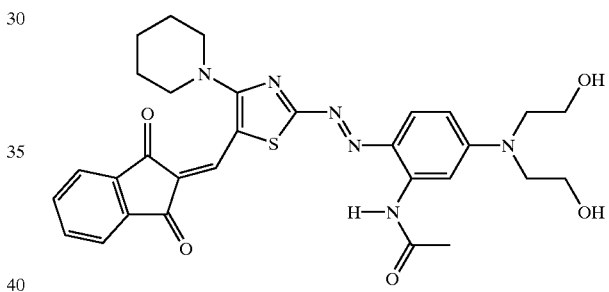

Formula 11

Step 1) 2-Amino4-chloro-5-formylthiazole (prepared as described in U.S. Pat. No. 4,395,544 incorporated herein by reference, 14.64 parts) was dissolved in a mixture of glacial acetic acid (390 parts) and concentrated sulphuric acid (81 parts) at 0–5° C. To this mixture was added 2N sodium nitrite solution (81 parts) over 0.25 hours, and the mixture was stirred at 0–5° C. for 1 hour.

Step 2) The product of step 1) was added dropwise to a stirred mixture of N,N-dihydoxyethyl-m-acetanilide (21.4 parts), methanol (300 parts) and sulfamic acid (3 part) over 0.25 hours while maintaining the temperature at 0–5° C. After 1 hour, water (300 parts) and solid sodium acetate was added to raise the pH to approximately pH 4 and the mixture was stirred for 1 hour. The product was isolated by filtration, washed with water and dried, before being dissolved in THF, filtered and evaporated to a small volume. Water was added, to precipitate the product which was isolated by filtration and dried at 70° C. to yield the product (21.25 parts).

Step 3) To a stirred solution of the product prepared in step 2) (20 parts) in pyridine (250 parts) was added indane-1,3-dione (14.6 parts) followed by a 2:1 mixture of acetic acid/piperidine (approximately 0.25 parts). The mixture was stirred over night at room temperature and then poured into hexane (2500 parts). The product precipitated and was isolated by filtration, washed twice with hexane followed by acetone and dried at 70° C.

Step 4) Piperidine (5.98 parts) was added dropwise to a stirred mixture of the product prepared in step 3) (19 parts) and DMF (200 parts) at 70° C., for 0.25 hours before cooling to room temperature and adding water. The precipitated product was isolated by filtration and purified by trituration in hot methylene chloride to yield the dye of formula 11 (3.2 parts).

Dye 12—Brown Solvent Soluble Dye of Formula 12

Formula 12

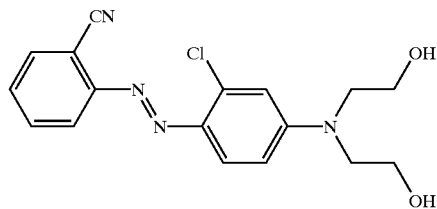

Step 1) Concentrated hydrochloric acid (60 parts) in water (400 parts) was added dropwise to a mixture of anthranilonitrile (23.6 parts), acetone (300 parts) and 2N sodium nitrite (100 parts) while maintaining the temperature at 0–5° C. After 1 hour at 0–5° C., 10% sulphamic acid solution was added to destroy any excess nitrous acid.

Step 2) The product of step 1) was added dropwise to a stirred mixture of N,N-dihydoxyethyl-m-chloroaniline (45 parts), acetone (200 parts), water (50 parts) and sulfamic acid (1 part) over 0.5 hours while maintaining the temperature at 0–5° C. After 1 hour, solid sodium acetate was added to raise the pH to approximately pH 4 and the mixture was stirred for 1 hour. The product precipitated was isolated by filtration, washed with water and dried at 70° C. to yield the dye of Formula 12 (61.6 parts).

Dye 13—Black Water Soluble Dye of Formula 13

(1000 parts) with the addition of 2N sodium hydroxide to pH 9.0, added to concentrated hydrochloric acid (100 parts) and water (400 parts) and stirred with a high shear mixer at ambient temperature for 1.25 hours to give a diazonium mixture. Excess nitrous acid was destroyed by addition of sulfamic acid until starch paper showed no immediate change.

Step 4) 2,8-Dihydroxy naphthalene-6-sulfonic acid (263 parts), sodium hydrogen sulphite (259 parts), water (900 parts) and 1,8-diaminooctane (400 parts) were stirred at 80° C. for 20 hours and then a further 20 hours at 95° C. The reaction was allowed to cool over night and filtered. The resultant filter cake was stirred in water (500 parts) and 2N sodium hydroxide (750 parts) for 15 minutes. 2N Hydrochloric acid (300 parts) was added and the precipitate filtered. The filter cake was dissolved in water (500 parts) and 2N sodium hydroxide (1000 parts) by heating to 50° C. 2N Hydrochloric acid was added and the precipitate filtered off at 40° C. The filter cake was oven dried at 70° C. to produce a naphthalene intermediate (111 parts).

Step 5) The product of step 3) was added slowly to a solution of the product of step 4) (96 parts) in water (1000 parts) which had previously been adjusted to pH 11 with sodium carbonate (50 parts) and 2N sodium hydroxide, at 0–10° C. and the pH was maintained at 10–11 by addition of 2N sodium hydroxide. The mixture was stirred for 2 hours at 0–10° C. and overnight at room temperature, before adjusting the pH to 6.5 with concentrated hydrochloric acid. The product was isolated by filtration, dissolved in water (500 parts) with concentrated ammonia (750 parts) and reprecipitated in concentrated hydrochloric acid (500 parts). The precipitate suspended in water (700 parts) and concentrated ammonia (200 parts) and the suspension was dialysed to <100 μs/cm and screened at 60° C. using glass microfibre GF/D filter paper, before evaporating to dryness at 80° C. to yield the dye of Formula 13 (127 parts) as the ammonium salt.

Formula 13

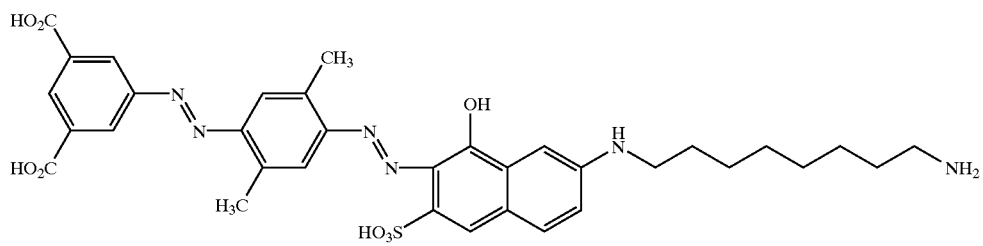

Step 1) 5-Aminoisophthalic acid (109 parts) and sodium nitrite (46 parts) were dissolved in water (1000 parts) with the addition of 2N sodium hydroxide to pH 7.7, and the resulting mixture added slowly to concentrated hydrochloric acid (180 parts) at 0–10° C. The mixture was stirred for 2 hours at 0–100C. Excess nitrous acid was decomposed by the addition of sulfamic acid until starch paper failed show an immediate change.

Step 2) A solution of 2,4-dimethoxyaniline (92 parts) in methylated spirit (2000 parts) was added slowly to the product of step 1) and stirred at 0–10° C. for 2 hours. Water (4000 parts) was added and the reaction stirred over night at room temperature. The product was isolated by filtration, stirred in 2N hydrochloric acid (1500 parts), filtered again and oven dried at 40° C. to produce a mono-azo intermediate (364 parts).

Step 3) The mono-azo intermediate (step 2)) (105 parts) and sodium nitrite (28 parts) were was dissolved in water Step 6) An ion exchange column packed with strongly acidic resin (H+form) was flushed with an aqueous solution of triethylamine (5% v/v) until the elluent tested basic with indicator paper pH 8–10. The product of step 5) (66 parts) was dissolved in water (1300 parts) with the addition of triethylamine to pH 9.0 and passed through the column. Water was flushed through the column until the elluent appeared to have very little colour. The elluent was evaporated to dryness to yield dye of Formula 13 (72 parts) as the triethylamine salt.

Preparation of Coloured Water-dissipatable Polyurethanes

EXAMPLES 1–25

Preparation of coloured polyurethanes for examples 1 to 25 were carried out as described below in stages 1) and 2).

The components for examples 1 to 25 and the properties of the resultant polymers are shown below in Table 1. In Table 1, where two alternatives a) or b) are given the alternative a) was used in all cases except where an asterisk in the Example column indicates otherwise.

Stage 1:

Components 1, 2, 3, 4 and 6 were charged to a stirred reaction vessel under a nitrogen atmosphere and heated to 90° C. and component 7 was added. The reaction exothermed by about 3° C. and was then maintained at 90–95° C. for 3 hours. The isocyanate (—NCO) content was measured. Component 5 followed by component 8 were added to the mixture, and the temperature was maintained at 90° C. for a further 2 hours.

Stage 2:

The product from stage 1 at 90° C. was added to a mixture of component 10 and component 11 at 30° C. containing where indicated in Table 1, component 9 (an isocyanate-reactive chain terminator). During this addition the temperature of the mixture rose to about 35° C. to 45° C. The mixture was stirred for a further one hour, cooled to room temperature and filtered through a 50 μm cloth filter. The pH and solids content of the product of stage 2 were measured and are shown in Table 1.

The molecular weight distribution of the resultant polyurethane was measured by gel permeation chromatography (GPC) to give the weight average molecular weight, Mw, and a number average molecular weight, Mn indicated in Table 1.

Stage 3:

The product from stage 2 was filtered through a cascade of filters (glass microfibre GF/A, GF/F and membrane) to 0.45 micron and then purified by reverse osmosis using a 3000 MW cut off membrane until the effluent had a conductivity of <100 μS/CM and evaporated to dryness at approximately 70° C.

TABLE 1

| No | Component a) or b) an alternative component* | Ex. 1 | Ex. 2 | Ex. 3 | Ex. 4 | Ex. 5 | Ex. 6 | Ex. 7 |
|---|---|---|---|---|---|---|---|---|
| 1 | Isophorone diisocyanate | 19.8 | 21.1 | 24.96 | 51.9 | 16.4 | 14.5 | 23.7 |
| 2 | Dye | Formula 1 21.5 | Formula 1 19 | Formula 1 11.5 | Formula 1 10 | Formula 2 8.35 | Formula 3 11.4 | Formula 4 19 |
| 3 | polyproylene glycol of molecular weight 1000 | 7.8 | 7.8 | 7.8 | 23.05 | 2.29 | 1.7 | 5.2 |
| 4 | a) dimethylol propionic acid or b) EGSSIPA* | 0.9 | 2.1 | 5.8 | 15 | 3 | 2.4 | 2.1 |
| 5 | a) methoxy polyethylene glycol of molecular weight 350 or b) 2-butanone oxime* | 23.9 | 25.3 | — | 66 | 16.2 | 14.4 | 27.7 |
| 6 | N-methyl pyrrolidone (solvent) | 22.1 | 22.5 | 22.5 | 25 | 40 | 50 | 22.5 |
| 7 | a) dibutyl tin dilaurate or b) DABCO* (catalyst) | 0.05 | 0.05 | 0.1 | 0.1 | 0.03 | 0.03 | 0.05 |
| 8 | a) dibutyl tin dilaurate or b) DABCO* (catalyst) | 0.05 | 0.05 | — | 0.1 | 0.03 | 0.03 | 0.03 |
| 9 | a) diethanolamine or b) hydrazine monohydrate | — | — | 7.72 | — | — | — | — |
|  | isocyanate content (stage 1) (—NCO %) | <0.1% | <0.1% | <0.1% | <0.1% | 3.3 | 2.5 | 5.0 |
| 10 | distilled water | 176.5 | 176.5 | 117.4 | 463 | 85.2 | 76.4 | 188 |
| 11 | ammonia | 0.6 | 1.2 | 3.5 | 9.9 | 1.5 | 1.36 | 1.2 |
| Results | solids content % | 24.6 | 25.1 | 29.1 | 24.5 | 26.1 | 25.9 | 23 |
|  | pH | 7.5 | 7.4 | 9.4 | 8.7 | 9.05 | 7.5 | 7.5 |
|  | Mw | 4428 | 4943 | 3924 | 4808 | 2874 | 2367 | 3960 |
|  | Mn | 1844 | 1750 | 1350 | 1406 | 1038 | 836 | 1480 |

| No | Component a) or b) an alternative component* | Ex. 8 | Ex. 9 | Ex. 10 | Ex. 11 | Ex. 12 | Ex. 13 | Ex. 14 |
|---|---|---|---|---|---|---|---|---|
| 1 | Isophorone diisocyanate | 14.9 | 13.5 | 12.83 | 13.82 | 15.3 | 24.9 | 24.9 |
| 2 | Dye | Formula 5 11.4 | Formula 6 11.4 | Formula 7 11.4 | Formula 8 11.4 | Formula 4 7.98 Formula 8 3.42 | Formula 1 11.5 | Formula 1 11.5 |
| 3 | polyproylene glycol of molecular weight 1000 | 2.4 | 3.9 | 4.5 | 2.4 | 0.82 | 7.8 | 7.8 |
| 4 | a) dimethylol propionic acid or b) EGSSIPA* | 1.3 | 1.3 | 1.3 | 2.4 | 2.4 | 5.8 | 5.8 |
| 5 | a) methoxy polyethylene glycol of molecular weight 350 or b) 2-butanone oxime* | 17.15 | 12.85 | 12.56 | 15.6 | 15.5 | — | b) 5.1* |
| 6 | N-methyl pyrrolidone (solvent) | 40 | 40 | 40 | 30 | 30 | 22.5 | 22.5 |
| 7 | a) dibutyl tin dilaurate or b) DABCO* (catalyst) | 0.03 | 0.03 | 0.03 | 0.03 | 0.03 | 0.05 | 0.05 |
| 8 | a) dibutyl tin dilaurate or b) DABCO* (catalyst) | 0.03 | 0.03 | 0.03 | 0.03 | 0.03 | — | — |
| 9 | a) diethanolamine or b) hydrazine monohydrate* | — | — | — | — | — | 6.8 | — |
|  | isocyanate content (stage 1) (—NCO %) | 3.0 | 2.6 | 2.2 | 3.3 | 3.2 | 3.5 | 0 |
| 10 | distilled water | 95.3 | 76.5 | 81.4 | 97 | 98.1 | 129 | 125 |

TABLE 1-continued

| No | Component a) or b) an alternative component* | | | | | | | |
|---|---|---|---|---|---|---|---|---|
| 11 | ammonia | 0.75 | 0.65 | 0.75 | 1.4 | 1.4 | 3.35 | 3.3 |
| Results | solids content % | 25 | 26.4 | 25.6 | 25 | 24.8 | 29.1 | 26.2 |
| | pH | 7.4 | 7.3 | 7.4 | 7.9 | 7.5 | 9.4 | 8.7 |
| | Mw | 3308 | 3821 | 3750 | 3281 | 2881 | 3924 | 3424 |
| | Mn | 1229 | 1396 | 1329 | 1201 | 1179 | 1350 | 1584 |

| No | Component a) or b) an alternative component* | Ex. 15 | Ex. 16 | Ex. 17 | Ex. 18 | Ex. 19 | Ex. 20 | Ex. 21 |
|---|---|---|---|---|---|---|---|---|
| 1 | Isophorone diisocyanate | 24.9 | 49.9 | 14.5 | 12.3 | 10.98 | 11.2 | 10.59 |
| 2 | Dye | Formula 1 11.5 | Formula 1 23 | Formula 1 11.4 | Formula 1 8.4 | Formula 1 8.4 | Formula 1 8.4 | Formula 10 7.6 |
| 3 | polyproylene glycol of molecular weight 1000 | 7.8 | 15.5 | 1.7 | 6.9 | 8.3 | 7.5 | 0.2 |
| 4 | a) dimethylol propionic acid or b) EGSSIPA* | 5.8 | 11.5 | 2.4 | 1.2 and b) 1.2* | b) 2.4* | b) 3.0* | 1.6 |
| 5 | a) methoxy polyethylene glycol of molecular weight 350 or b) 2-butanone oxime* | 9.3 | b) 3.12* | 13.47 | 13.03 | 7.81 | 8.81 | 8.5 |
| 6 | N-methyl pyrrolidone (solvent) | 22.5 | 45 | 30 | 30 | 30 | 30 | 20 |
| 7 | a) dibutyl tin dilaurate or b) DABCO* (catalyst) | 0.05 | 0.1 | b) 0.6* | 0.03 | 0.3 | 0.03 | b) 0.4* |
| 8 | a) dibutyl tin dilaurate or b) DABCO* (catalyst) | 0.03 | — | b) 0.6* | 0.03 | 0.3 | 0.03 | b) 0.2* |
| 9 | a) diethanolamine or b) hydrazine monohydrate* | b) 0.52* | b) 0.71* | — | — | — | — | — |
| | isocyanate content (stage 1) (—NCO %) | 3.4 | 3.9 | 2.6 | 2.5 | 1.5 | 1.7 | 2.6 |
| 10 | distilled water | 114 | 116 | 95.4 | 95.3 | 80.2 | 83 | 218 |
| 11 | ammonia | 2.8 | 3.3 | 1.5 | 0.75 | — | — | 0.9 |
| Results | solids content % | 28.4 | 30.4 | 25.4 | 25.5 | 25.4 | 25.6 | 9.3 |
| | pH | 7.7 | 8.1 | 8.7 | 7.2 | 7.3 | 6.9 | 9.1 |
| | Mw | 8221 | 4845 | 3530 | 4593 | 5984 | 4827 | 5546 |
| | Mn | 2574 | 1885 | 1619 | 1772 | 2315 | 2163 | 2189 |

| No | Component a) or b) an alternative component* | Ex. 22 | Ex. 23 | Ex. 24 | Ex. 25 |
|---|---|---|---|---|---|
| 1 | Isophorone diisocyanate | 3.2 | 2.65 | 4.15 | 13.41 |
| 2 | Dye | Formula 9 2.15 | Formula 9 2.15 | Formula 11 3.14 | Formula 12 8.25 Formula 13 8.77 |
| 3 | polyproylene glycol of molecular weight 1000 | 0.64 | 1.05 | 1.45 | 1.34 |
| 4 | a) dimethylol propionic acid or b) EGSSIPA* | 0.5 | b) 0.65* | 0.76 | 2.0 |
| 5 | a) methoxy polyethylene glycol of molecular weight 350 or b) 2-butanone oxime* | 3.42 | 2.87 | 4.07 | 0.4 g of Triethylamine |
| 6 | N-methyl pyrrolidone (solvent) | 24 | 24 | 24 | 49 |
| 7 | a) dibutyl tin dilaurate or b) DABCO* (catalyst) | b) 0.13* | b) 0.13* | b) 0.19* | 0.125 |
| 8 | a) dibutyl tin dilaurate or b) DABCO* (catalyst) | b) 0.2* | b) 0.2* | b) 0.2* | 0.375 |
| 9 | a) diethanolamine or b) hydrazine monohydrate | — | — | — | — |
| | isocyanate content (stage 1) (—NCO %) | 1.2 | 1.0 | 1.3 | 3.4 |
| 10 | distilled water | 55 | 50 | 84 | 99 |
| 11 | ammonia | 0.2 | — | 0.43 | — |
| Results | solids content % | 9.8 | 9.9 | 9.8 | 10.7 |
| | pH | 8.2 | 9.1 | 8.5 | 5.96 |
| | Mw | 3815 | 2927 | 4435 | not measured |
| | Mn | 1573 | 1272 | 2066 | not measured |

DABCO = 1,4-diazabicyclo [2.2.2] octane
EGSSIPA — bis(2-hydroxyethyl)-5-sodiosulphoisophthalate Preparation of Inks Inks containing the coloured water-dissipatable polyurethanes described in Examples 1 to 25 were then prepared in a stock solution of water (90 parts) and N-methylpyrrolidone (10 parts) with the addition of concentrated ammonia to give a pH of 9–10 and filtering the resultant solution through a 0.45 micron membrane filter. The resultant inks were printed onto white Gilbert Bond, Xerox acid, Conqueror paper or glossy film using a Hewlett Packard (HP) 560 thermal. ink jet printer to give test prints. The properties of the resultant test prints are shown below in Table 2:

Highlighter Test:

The prints prepared above were tested for smear resistance to highlighter pens. Yellow highlighter pens (acid and alkaline) were used to draw a horizontal line across the series of printed vertical bars. The amount of ink smear on the white paper between the vertical bars was assessed visually and are shown in Table 2 where ✓=no smear occured.

Wet Fastness

Wet fastness is determined as follows; 0.5 cm³ of water is run down the test prints prepared above 5 minutes, one hour or 24 hours after printing. The scale is from 1 to 10 with 1 not being fixed at all and 10 being fully fixed i.e. producing no stain on the white paper.

Colour Coordinates, Lightness and Optical Denisty

Colour coordinates L a b, and the optical density of the prints were measured using an X-rite 938 spectrophotmeter.

The optical density is a measure of colour strength on a logarithmic scale.

The colour coordinates define the brightness and colour on a colour scale, where 'a' is a measure of redness (+a) or greenness (−a) and 'b' is a measure of yellowness (+b) or blueness (−b). The coordinates 'a' and 'b' approach zero for neutral colours (white, grays and blacks). The higher the values for 'a' and 'b' are, the more saturated a colour is.

The lightness 'L' is measured on a scale from 0 (white) to 100 (black).

Further inks may be prepared having the formulations described in Tables 3 and 4 below wherein the following abbreviations are used. Water may be included in each formulation to make the total number of parts up to 100. These inks may be applied to plain paper using an ink jet printer.

FRU fructose
PU*: Identifies which of the polyurethanes coloured water-dissipatable as prepared in examples 1 to 25 may be used. The number of parts by weight of PU is shown in brackets.
BZ: Benzyl alcohol
DEG: Diethylene glycol
DMB: Diethyleneglycol monobutyl ether
ACE: Acetone
IPA: Isopropyl alcohol
MEOH: Methanol
2P: 2-Pyrollidone
MIBK: Methylisobutyl ketone
SUR: Surfinol 465 (a surfactant)
PHO: $K_2PO_4$
TEN: triethanolamine
NMP: N-methylpyrrollidone
TDG: Thiodiglycol
CAP: Caprolactam
BUT: Butylcellosolve
GLY: Glycerol

TABLE 2

| Polyurethane from Example | Parts of polyurethane in ink (paper type) | Optical density OD | Lightness L | Colour coordinates a | Colour coordinates b | Westfastness after: 24 hours | 1 hour | 5 mins | Highlighter Test |
|---|---|---|---|---|---|---|---|---|---|
| 1 | 10 (Gilbert Bond) | 1.1 | 55.39 | +34.61 | +36.99 | 10 | 10 | — | ✓ |
| 2 | 15 (Gilbert Bond) | 1.1 | 54.33 | +36.24 | +34.98 | 10 | 10 | — | ✓ |
| 3 | 15 (Gilbert Bond) | 1.05 | 57.09 | +34.60 | +33.27 | 7 | 10 | — | ✓ |
| 4 | 2.5 (Gilbert Bond) | 0.5 | 79.36 | +12.39 | +26.66 | — | 10 | — | ✓ |
| 4 | 4.0 (Gilbert Bond) | 0.6 | 76.18 | +16.62 | +31.73 | — | 9 | — | ✓ |
| 4 | 8.0 (Gilbert Bond) | 0.7 | 71.02 | +22.38 | +36.31 | 10 | — | — | ✓ |
| 4 | 15 (Gilbert Bond) | 0.8 | 68.68 | +26.39 | +33.28 | 10 | — | — | ✓ |
| 5 | 15 (Gilbert Bond) | 1.1 | 82.15 | +3.88 | +82.04 | — | 10 | — | ✓ |
| 6 | 15 (Gilbert Bond) | 0.85 | 84.71 | −5.07 | +74.59 | — | 10 | — | ✓ |
| 7 | 15 (Gilbert Bond) | 1.1 | 39.22 | +25.63 | +10.13 | 10 | — | — | ✓ |
| 8 | 15 (Gilbert Bond) | 1.1 | 41.16 | +34.35 | −3.78 | — | 8 | — | ✓ |
| 9 | 5 (Gilbert Bond) | 0.8 | 48.4 | +24.6 | −37.82 | — | — | 10 | ✓ |
| 10 | 5 (Gilbert Bond) | 0.9 | 40.11 | +24.84 | −30.92 | — | — | 10 | ✓ |
| 11 | 15 (Gilbert Bond) | 1.09 | 35.17 | +7.45 | −23.3 | — | — | 10 | ✓ |
| 12 | 15 (Gilbert Bond) | 1.0 | 37.64 | +6.83 | 0.27 | — | — | 10 | ✓ |
| 11 and 13 in a 1:1 mix | 15 (Xerox acid) | 1.2 | 30.92 | +2.08 | −4.13 | — | — | 9 | ✓ |
| | 15 (Conqueror) | 1.1 | 33.1 | +2.76 | −5.71 | — | — | 9 | ✓ |
| | 15 (Glossy Film) | 1.8 | 14.2 | +1.29 | −6.45 | — | — | 10 | ✓ |
| 11 and 20 in a 1:1 mix | 15 (Xerox acid) | 1.1 | 32.12 | +2.06 | −3.18 | — | — | 10 | ✓ |
| | 15 (Conqueror) | 1.1 | 32.82 | +2.98 | −5.93 | — | — | 10 | ✓ |
| | 15 (Glossy Film) | 2.0 | 8.72 | +1.81 | −7.6 | — | — | 10 | ✓ |
| 14 | 10 (Gilbert Bond) | 0.81 | 66.24 | +28.20 | +30.36 | — | — | 10 | ✓ |
| 14 | 15 (Gilbert Bond) | 0.76 | 60.29 | +27.88 | +24.12 | — | — | 10 | ✓ |
| 15 | 10 (Gilbert Bond) | 0.83 | 65.47 | +25.40 | +35.20 | — | — | 10 | ✓ |
| 15 | 15 (Gilbert Bond) | 0.89 | 61.84 | +29.54 | +33.44 | — | — | 10 | ✓ |
| 16 | 15 (Gilbert Bond) | 0.71 | 65.19 | +23.73 | +23.96 | — | — | 10 | ✓ |
| 17 | 15 (Gilbert Bond) | 1.11 | 54.04 | +36.85 | +35.88 | — | — | 10 | ✓ |
| 18 | 15 (Gilbert Bond) | 0.94 | 58.31 | +31.87 | +30.64 | — | — | 10 | ✓ |
| 19 | 15 (Gilbert Bond) | 1.10 | 57.92 | +34.63 | +41.64 | — | — | 10 | ✓ |
| 21 | 15 (Gilbert Bond) | 0.8 | 74.2 | 17.41 | +47.15 | — | 10 | — | ✓ |
| 22 | 15 (Gilbert Bond) | 1.03 | 37.04 | 1.99 | −10.19 | — | — | 10 | ✓ |
| 23 | 15 (Gilbert Bond) | 1.05 | 36.3 | 1.17 | −8.73 | — | — | 10 | ✓ |
| 24 | 20 (Gilbert Bond) | 1.02 | 37.02 | 1.81 | −0.81 | — | — | 10 | ✓ |
| 25 | 15 (Gilbert Bond) | 1.05 | 35.4 | 1.63 | 1.36 | 9–10 | — | — | ✓ |

[— = not measured], [✓ = no smear], [X = Not measurable, near total failure of printhead, therefore no test prints available to assess]

TABLE 3

| PU* (parts) | BZ | DEG | ACE | NaOH | (NH$_4$)$_2$SO$_4$ | IPA | MEOH | 2P | MIBK | GLY | NMP | BUT |
|---|---|---|---|---|---|---|---|---|---|---|---|---|
| 4(10)   |    | 6 | 4   |     |     |    |   |    | 9 | 1 | 10 |   |
| 16(10)  | 6  | 4 |     | 0.2 |     |    |   | 15 |   |   |    |   |
| 10(6)   | 8  |   | 1   |     |     |    |   | 5  | 1 | 3 | 15 | 2 |
| 8(12)   |    | 9 |     | 0.5 | 0.5 |    |   | 9  | 5 |   |    | 1 |
| 11(5)   | 15 | 3 | 3   |     |     | 5  |   | 3  | 4 |   |    |   |
| 5(15)   | 19 |   |     |     |     | 10 |   |    |   | 2 | 2  |   |
| 17(5)   | 4  |   | 4   |     |     |    | 6 | 15 | 4 |   |    | 2 |
| 12(18)  | 5  | 2 | 10  | 0.1 | 0.3 |    |   |    |   |   | 10 |   |
| 1(4)    | 5  | 3 | 6   |     |     | 5  | 5 | 6  | 5 |   |    |   |
| 21(10)  | 7  | 2 | 2   |     |     | 2  |   | 4  |   | 4 |    |   |
| 15(14)  | 5  |   |     |     |     |    |   | 12 |   |   |    | 5 |
| 18(12)  |    | 9 |     |     |     |    | 2 |    | 6 |   | 5  | 2 |
| 2(5)    | 10 |   | 7   | 0.3 |     | 3  |   | 10 |   | 1 |    |   |
| 17(4)   | 18 | 2 | 1   |     |     |    |   | 15 | 2 |   | 3  |   |
| 22(7)   | 5  | 2 |     |     | 0.1 |    |   | 14 |   |   | 10 | 1 |

(Water is included in each formulation to make the total number of parts up to 100)

TABLE 4

| PU* (parts) | BZ | NMP | SUR | TEN | TDG | FRU | PHO | DMB | CH$_3$NH$_2$ | CAP |
|---|---|---|---|---|---|---|---|---|---|---|
| 2(10)  | 5  |    | 0.15 | 0.5 | 20 |     |      |    |     |   |
| 2(15)  | 6  | 15 |      |     |    |     | 0.12 |    |     | 4 |
| 3(10)  | 8  |    | 0.3  |     | 15 |     |      |    | 0.2 |   |
| 3(5)   | 10 | 20 |      |     |    | 0.5 | 0.2  |    |     |   |
| 6(15)  | 15 | 15 |      |     | 5  |     |      |    |     | 2 |
| 5(10)  | 10 | 4  |      |     |    | 1   |      | 4  | 0.2 |   |
| 7(10)  | 10 | 3  |      |     |    | 2   |      | 6  |     |   |
| 9(15)  | 9  | 7  |      | 0.5 |    |     | 0.95 | 5  |     |   |
| 7(10)  | 11 |    |      |     | 10 |     |      | 6  |     | 1 |
| 18(12) | 5  | 17 |      |     |    |     |      | 7  |     |   |
| 20(15) | 5  | 5  | 0.1  | 0.2 | 2  | 0.5 | 0.1  | 5  |     |   |
| 19(10) | 10 | 5  |      |     | 12 |     |      | 5  |     |   |
| 14(20) | 5  | 8  |      |     |    |     |      | 5  |     | 2 |
| 13(13) |    | 2  |      |     |    |     |      | 12 |     |   |
| 14(5)  | 10 |    |      | 1   | 1  |     |      |    | 1   | 1 |

(Water is included in each formulation to make the total number of parts up to 100)

What is claimed is:

1. An ink having a viscosity of less than 20 cp at 20° C. comprising
   (a) a non-isocyanate terminated, coloured, water-dissipatable polyurethane, having a weight average molecular weight from 1,000 to 15,000 obtained from the reaction of a mixture comprising the components:
      (i) at least one organic polyisocyanate;
      (ii) at least one isocyanate-reactive compound providing ionic water-dispersing groups provided that the isocyanate-reactive compound providing ionic water-dispersing groups excludes polyesters bearing sulphonic acid groups; and
      (iii) at least one colorant having at least two functional groups selected from isocyanate groups and isocyanate-reactive groups;
         where the proportion of insoluble polyurethane in water is less than 50%;
         provided that the polyurethane is not a chain-extended polyurethane and
   (b) a liquid medium.

2. An ink according to claim 1 which has been filtered through a filter having a mean pore size below 10 $\mu$M.

3. An ink according to claim 1, suitable for use in a thermal ink jet printer.

4. A process for printing an image on a substrate comprising applying thereto an ink according to claim 1, by means of an ink jet printer.

5. An ink jet printer cartridge containing an ink according to claim 1.

6. An ink according to claim 1, wherein said polyurethane has a weight average molecular weight of from 1,000 to 10,000.

7. An ink according to claim 1, wherein said polyurethane is yellow, magenta, cyan, or black.

8. A process for printing an image on a substrate comprising applying thereto an ink according to any one of claims 6 or 7, by means of an ink jet printer.

9. An ink jet printer cartridge containing an ink according to any one of claims 2, 3, 6 or 7.

* * * * *